United States Patent [19]
Dietz

[11] 3,949,336
[45] Apr. 6, 1976

[54] SEQUENTIAL RESETTING CIRCUIT INTERRUPTER

[75] Inventor: Robert E. Dietz, Cedar Rapids, Iowa

[73] Assignee: Square D Company, Park Ridge, Ill.

[22] Filed: Jan. 8, 1975

[21] Appl. No.: 539,365

[52] U.S. Cl. ............................... 335/166; 335/107
[51] Int. Cl.² .......................................... H01H 9/20
[58] Field of Search ............ 337/71, 72, 76; 335/18, 335/106, 107, 165, 166, 203

[56] References Cited
UNITED STATES PATENTS

| | | | |
|---|---|---|---|
| 2,162,126 | 6/1939 | Shaw | 335/166 X |
| 3,771,087 | 11/1973 | Riendeau | 337/72 X |
| 3,864,649 | 2/1975 | Doyle | 335/166 X |
| 3,868,614 | 2/1975 | Riendeau | 337/72 X |

FOREIGN PATENTS OR APPLICATIONS

| | | | |
|---|---|---|---|
| 1,222,428 | 3/1967 | United Kingdom | 335/166 |

*Primary Examiner*—J D Miller
*Assistant Examiner*—Fred E. Bell
*Attorney, Agent, or Firm*—Harold J. Rathbun; Ernest S. Kettelson

[57] ABSTRACT

A circuit interrupter to trip on occurrence of ground faults or the like in which the neutral and electrified contacts are mounted to open and close in a predetermined sequence when being reset. When closing to reset the mechanism, the neutral contacts make first and the "hot" or electrified contacts can only make after the neutral contacts have closed. On pushing the reset button to open, the converse is true. The hot or electrified contacts break first and the neutral contacts can break only after the electrified contacts have separated and interrupted the hot conductor. This sequential operation protects the circuit from an inadvertent making of the hot contacts while the neutral contacts were still open. Under such condition, the circuit would be electrified but there would be no ground fault protection. The ground fault interrupter would not be powered as long as the neutral contacts remain open. A resistor is connected between the ground terminal and the neutral conductor on the load side of the breaker to protect against cross wiring the line conductors to the ground fault interrupter terminals. If the hot or electrified line conductor is mistakenly cross-wired to the neutral terminal of the ground fault interrupter, the resistive connection between neutral and ground simulates a ground fault condition and causes the mechanism to trip. It cannot be reset as long as the hot wire is connected to the neutral terminal of the interrupter.

11 Claims, 10 Drawing Figures

SEQUENTIAL RESETTING CIRCUIT INTERRUPTER

BACKGROUND OF THE INVENTION

This invention relates to the field of ground fault circuit interrupters having a two pole breaking mechanism, one pole for the hot or electrified conductor and one for the neutral conductor. A problem arises with such two pole breakers if the hot contacts inadvertently make first and the neutral contacts remain separated. The circuit downstream from the ground fault circuit interrupter, or the device which it is supposed to protect, will be hot, but the ground fault interrupting mechanism will not be powered as long as the neutral contacts are separated. The trip coil cannot operate to trip the interrupting mechanism, and whatever indication means are provided will indicate a set or operative condition. An inspection of the indicator would lead one to believe the ground fault mechanism was operative and the circuit protected when in fact this would not be the case.

Previous attempts to solve this problem have included a separate switch to energize the ground fault circuit interrupter before the main breakers close and to de-energize the interrupter after the main circuit breaker contacts open on occurrence of a ground fault. Another approach to the problem made use of an over-center compression device associated in an appropriate manner with the main circuit breaker contacts, whereby the contacts are urged to a fully open or a fully closed position but could not be held in between. The present invention dispenses with the need for either a separate switch, compression member or other additional component. Instead, it provides sequential contact opening and closing means which opens or breaks the hot contacts first and the neutral thereafter, and which conversely closes or makes the neutral contacts first and the hot contacts only after the neutral contacts have closed. The structure which incorporates such means in accordance with this invention includes a contact carrier having a transversely rockable contact arm, one end of which carrying the hot or electrified contact is movable a greater relative distance then the opposite end carrying the neutral contact when the contact carrier is moved both in a contact closing direction and a contact opening direction.

Means to provide greater relative movement for the hot contact side of the contact arm may be incorporated in the movable contacts or carrier, or alternatively in the corresponding stationary contacts or mountings. The movable contact carrier may have a transversely canted or inclined groove underneath to receive the main spring cross bar, the groove being deeper toward the hot contact side of the contact arm to enable that side to move relatively greater distances than the opposite neutral contact side.

One or both of the neutral contacts may be longer in elevation (or mounted closer together) so the gap between them when open is shorter than the gap between the hot contacts. The hot contact side of the contact arm will therefore have to travel relatively greater distances to open and close than the opposite neutral contact side. When the neutral contacts close across the relatively shorter gap, the hot contacts are still separated. The main spring biased against the underside of the contact carrier rocks the still separated hot contact side of the contact arm in the closing direction causing the contact arm and carrier to cant somewhat until the hot contacts are also closed.

SUMMARY OF THE INVENTION

It is an object of the invention to provide an improved ground fault circuit interrupter having sequentially opening and closing main contacts.

It is an object of the invention to provide an improved ground fault circuit interrupter in which the neutral contacts close first and the hot contacts close thereafter.

It is an object of the invention to provide a ground fault circuit interrupter having a contact carrier with a cross arm carrying a hot contact at one end and a neutral contact at the opposite end, the cross arm being transversely rockable and the hot contact end being movable relatively greater distances in the contact opening and closing directions than the opposite neutral contact end of the contact arm.

It is an object of the invention to provide a ground fault circuit interrupter wherein the gap between the neutral contacts is relatively shorter than the gap between the hot contacts, whereby the neutral contacts close before the hot contacts and conversely the hot contacts break before the neutral contacts.

It is an object of the invention to provide a ground fault circuit interrupter having sequentially opening and closing main contacts, including protection against cross-wiring the hot and neutral line conductors to the neutral and hot terminals of the ground fault interrupter.

It is an object of the invention to provide a ground fault circuit interrupter having neutral, hot, and ground terminals, breaker contacts therein to interrupt the neutral and hot conductors respectively, and a resistance connected between said neutral conductor on the load side of said breaker contacts and said ground terminal to simulate a ground fault if the hot line conductor is inadvertently connected to the neutral terminal of the ground fault circuit interrupter, thereby causing the interrupter to trip.

DESCRIPTION OF PREFERRED EMBODIMENT

Figure 1:
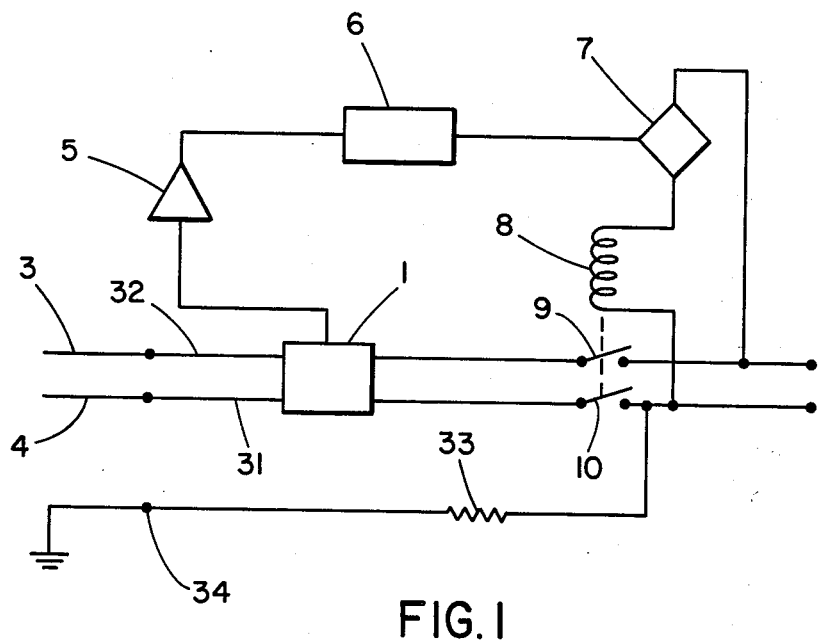
FIG. 1 is a schematic drawing of a circuit in which the sequential resetting circuit interrupter in accordance with this invention is used.
Figure 2:
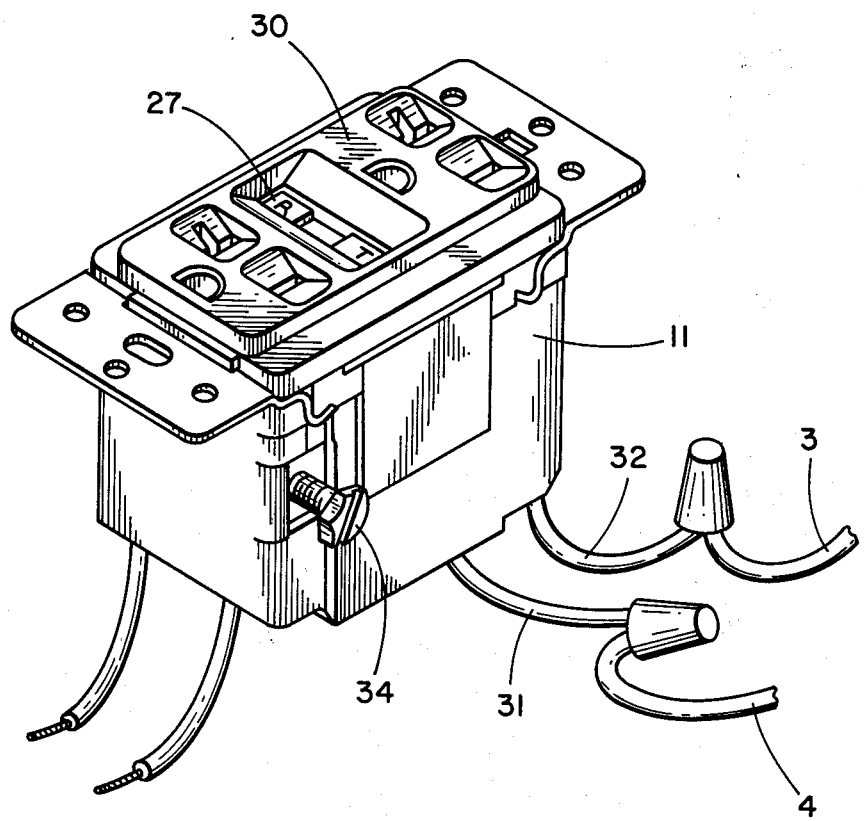
FIG. 2 is a perspective view of a device in which the invention herein is incorporated.
Figure 3:
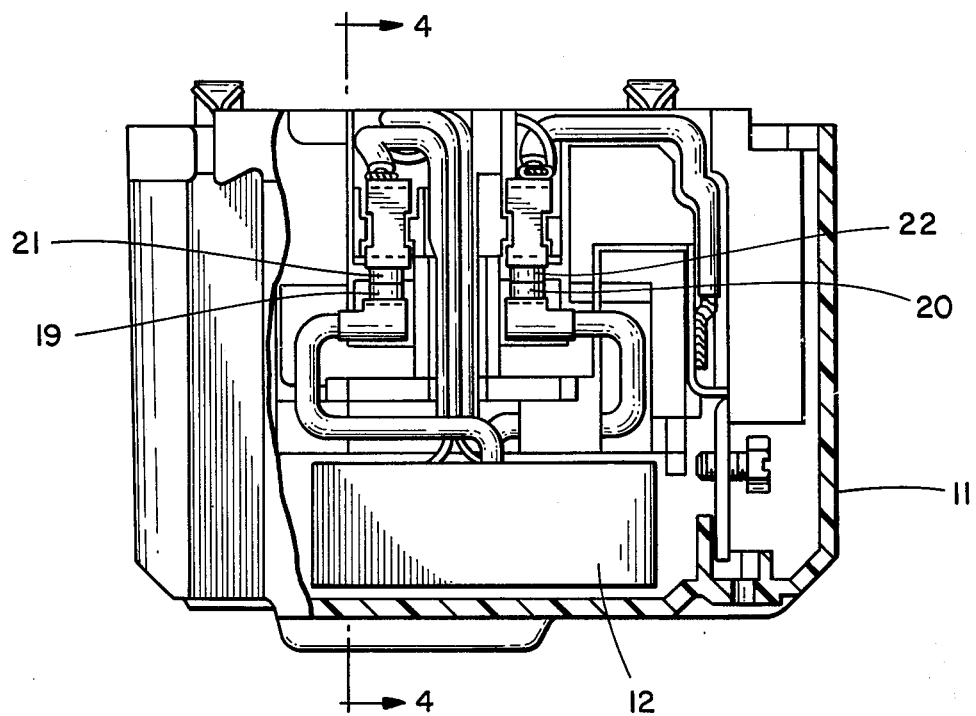
FIG. 3 is a side elevation view of the device in FIG. 2 having a portion of its side wall broken away.
Figure 4:
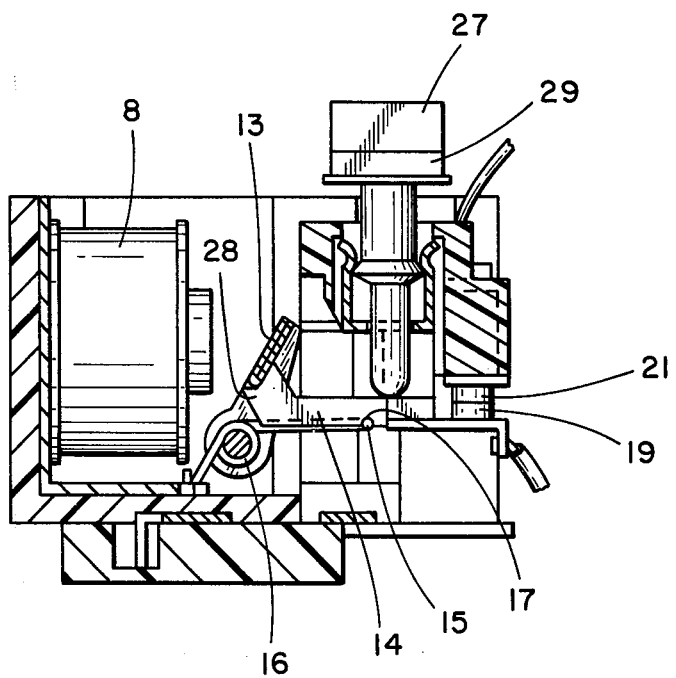
FIG. 4 is a section view taken on line 4—4 of FIG. 3.
Figure 5:
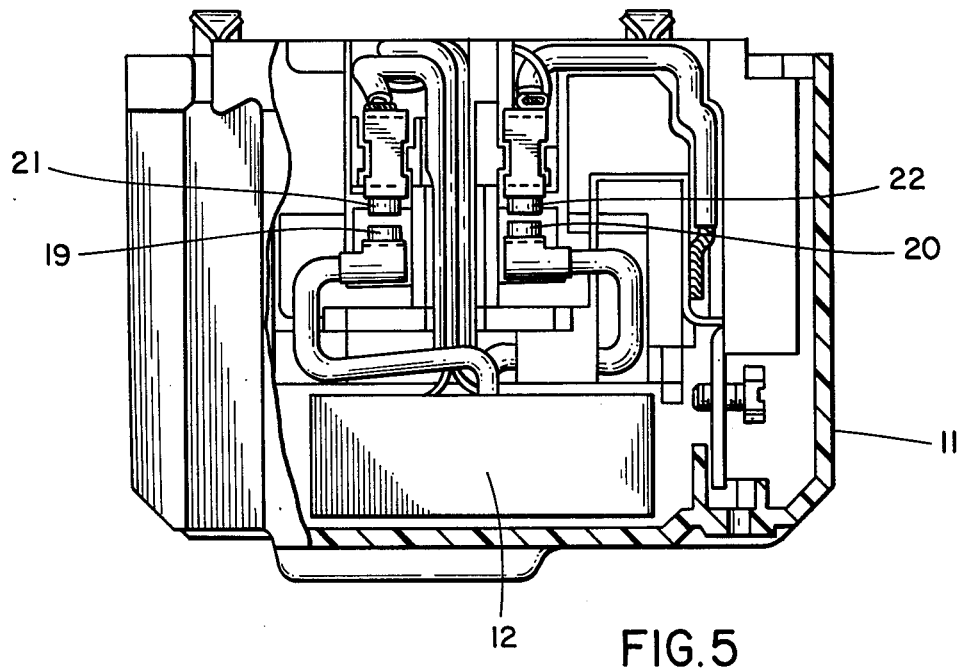
FIG. 5 is an elevation view of the device in FIG. 3 showing the contacts and carrier at an incline when being reset.
Figure 6:
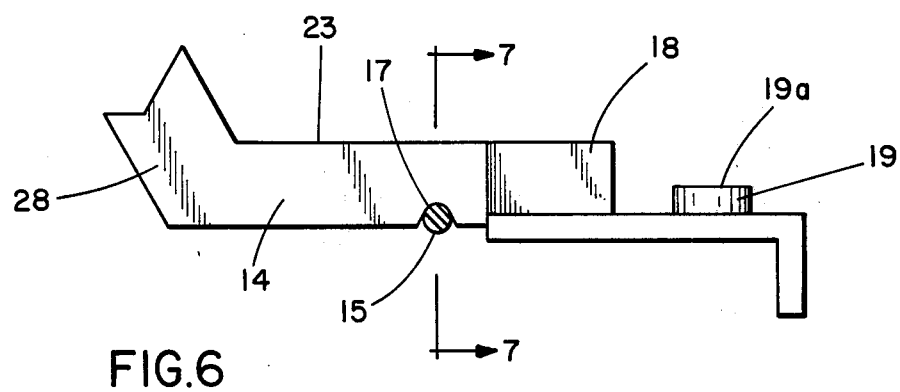
FIG. 6 is a side elevation of the contact carrier in accordance with one embodiment of this invention.
Figure 7:
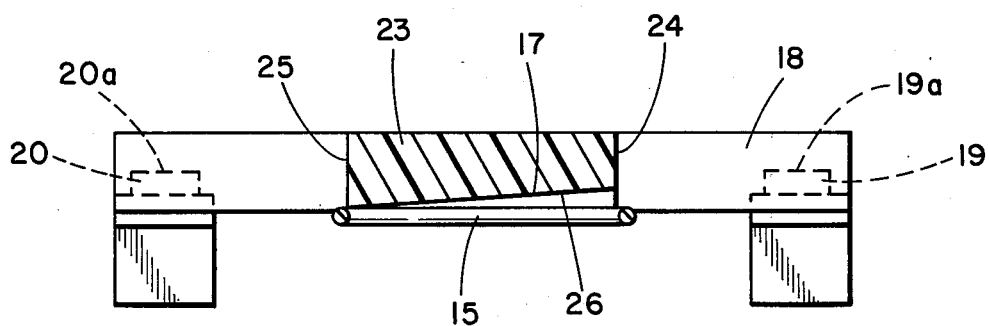
FIG. 7 is a section view taken on line 7—7 of FIG. 5.
Figure 8:
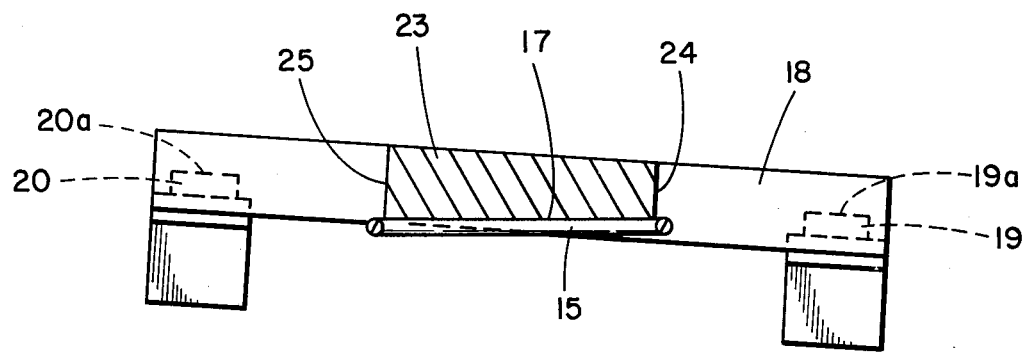
FIG. 8 is the section view of FIG. 6 showing the contact carrier at an incline laterally when the main spring is fully seated in the inclined transverse groove of the carrier.

A ground fault circuit interrupter is shown diagrammatically in FIG. 1, having differential transformer means 1 which senses a ground fault in the line conductor 3 and also a ground neutral condition in the neutral conductor 4. Amplifier means 5 picks up the ground fault or grounded neutral signal and applies an amplified signal to electronic switching means 6, which shorts out the rectification supply means 7 that ordinarily powers the sensing circuit and applies full line voltage across trip coil 8 causing it to trip and open the first pole 9 (to interrupt the hot or electrified conductor 3) and the second pole 10 (to interrupt the neutral conductor 4) of the two pole interrupter. The electronic components and circuit described and shown herein are merely illustrative, and any ground fault circuit interruption circuitry may be used with this invention.

An electrical device 11 in which the ground fault circuit interrupter is incorporated is shown in FIG. 2–5. The electronic components comprising the differential transformers 1 and 2, amplifier means 5, switching means 6 and rectification means 7 are encased in the module 12. The trip coil 8 is mounted in the device 11 to attract armature 13 when energized on occurrence of a ground fault causing the armature to trip. When armature 13 trips, contact carrier 14 is unlatched and biased upward by the cross-bar 15 of main spring 16. Cross-bar 15 is seated in a lateral groove 17 formed in the under-side of contact carrier 14.

The contact carrier 14 includes a cross arm 18 at its forward end providing a T-shaped configuration. Movable contacts 19 and 20 are mounted at the respective opposite end regions of cross arm 18, contact 19 being designated the hot or electrified contact and contact 20 the neutral contact. Stationary contacts 21 and 22 are mounted in the device 11 for contact respectively with movable contacts 19 and 20, stationary contact 21 being hot and stationary contact 22 being the neutral. Contacts 19 and 20 have contact faces 19a and 20a respectively which lie in the same plane and said plane is normally parallel to the axis of said main spring cross-bar 15.

The leg portion 23 of T-shaped contact carrier 14 includes opposite side walls 24 and 25, side wall 24 being on the same side of the carrier 14 as hot contact 19 and side wall 25 being on the same side as neutral contact 20. The lateral groove 17 becomes continually deeper as it extends across the underside of carrier 14 from side wall 25 (the neutral contact side) to side wall 24 (the hot contact side). The floor 26 of the groove 17 thus extends in cross-section at an incline, or cant, rising from a lower elevation at side 25 (neutral side) to a higher elevation at side 24 (hot side).

When reset button 27 is pushed to bear against the upper side of contact carrier 14 to reset and close contacts 10–21 (hot) and 20–22 (neutral), the carrier tilts or cants as the cross-bar 15 of the main spring seats in the deeper portion of the groove 17. The carrier 14 drops somewhat on the hot side 24, so the gap between hot contacts 19 and 21 becomes somewhat greater than the gap between neutral contacts 20 and 22. At this time, the plane in which contact surfaces 19a and 20a lie extends at an angle to the axis of main spring cross-bar 15.

The downward thrust of reset button 27 on the upper side of carrier 14 and the opposite thrust of main spring 16 on the under side of the carrier causes it to rock on the main spring cross bar 15 in a contact closing direction. The rearward end 28 rocks downward into latching position with armature 13, and the forward contact carrying end rocks upward into contact closing engagement with respective stationary contacts 21 and 22.

The neutral contacts 20 and 22 close first because of the shorter gap between them caused by carrier 14 canting and dropping somewhat on the hot contact side due to the incline of lateral groove 17. After the neutral contacts 20 and 22 close, main spring 16 continues its upward thrust against the underside of carrier 14 causing it to rock laterally from a canted or tilted cross-section position, raising the hot contact side 24 until movable hot contact 19 engages and closes against stationary hot contact 21.

The contacts 19–21 and 20–22 respectively thereby close in sequence, the neutral contacts 20–22 first and hot contacts 19–21 only after electrical contact has been made by the neutral contacts. When the mechanism trips due to a ground fault or grounded neutral condition, the contacts tend to open simultaneously in a rocking motion on main spring cross-bar 15 as it biases upwardly against the underside of carrier 14 when the latching mechanism trips releasing the rearward end 28.

However, if the contacts are opened by pressing on the reset button 27 after the carrier 14 has latched in a set position, the thrust against the upper side of carrier 14 will cause the carrier to tilt until the deeper portion of lateral groove 17 on the hot contact side 24 comes into contact with main spring cross-bar 15. Such lateral rocking action, or canting action, causes hot contacts 19 and 21 to separate and break electrically before neutral contacts 20 and 22.

This structure prevents inadvertent teasing of the contacts, or setting of the contacts, in a condition where the hot contacts 19 and 21 are able to close or make electrically while the neutral contacts 20 and 22 are still open. In such condition with the neutral contacts open, the ground fault circuit interrupting mechanism will not be operative. However, if the hot contacts 19 and 21 are closed, the indicator band 29 on reset button 27 will not show outward of face plate 30 so a visual inspection would seem to indicate the ground fault interrupter was in operative condition. Also, the device 11 would be hot and without protection of a ground fault occurs if the condition was allowed to exist whereby neutral contacts 20 and 22 could remain open while hot contacts 19 and 21 were closed. The embodiment of this invention as described above prevents such a condition from occuring.

Figure 9:
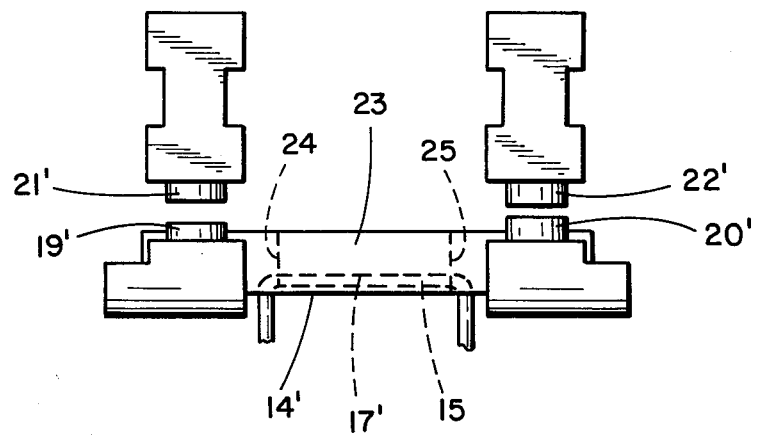
FIG. 9 is an elevation view of the contacts in a modified embodiment of this invention.
Figure 10:
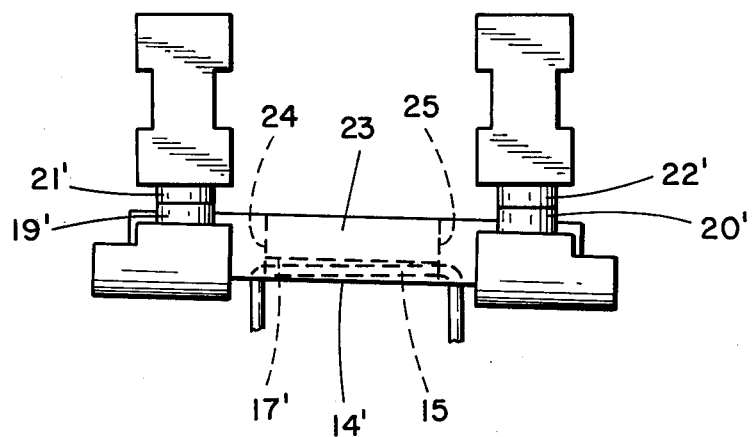
FIG. 10 is an elevation view of the modification in FIG. 8 showing the contact carrier at an incline laterally when the contacts are closed.

A modification is illustrated in the embodiment shown in FIGS. 9 and 10. In this embodiment of the invention, the gap between neutral contacts 20' and 22' is made shorter than the gap between hot contacts 19' and 21' by making neutral contacts 20' and 22' longer in elevation then their respective hot contact counterparts. In this modification, lateral groove 17' may be of uniform depth throughout its lateral extent across the under side of carrier 14'. Lateral rocking or canting action of the carrier to provide greater travel on the hot contact side results from first closing of neutral contacts 20' and 22' across the shorter gap while a gap still exists between hot contacts 19 and 21'. Continued thrust against the underside of carrier 14' from main spring cross-bar 15 forces the hot contact side of the carrier to continue in the contact closing direction until hot contacs 19' and 21' close. In this embodiment, the carrier 14' is canted when both sets of contacts are closed. Obviously, only one of the neutral contacts 20 need be relatively longer to shorten the gap and travel between the neutral contacts relative to that between the hot contacts 19' and 21. Alternatively, the mountings for either or both neutral contacts could be spaced closer together to achieve the same result.

To prevent cross-wiring of the hot line conductor 3 to the neutral terminal lead 31 (which feeds the ground fault interrupting mechanism) and the neutral line conductor 4 to the hot terminal lead 32, a resistor 33 of high resistance such as a 22 kilo-ohm resistor is connected in series between the neutral conductive path on the load side of the breaker contacts and the ground terminal 34 of device 11. If the hot line conductor 3 is connected to neutral terminal lead 31, current will flow into terminal lead 31, through the normally neutral conductive path within device 11 into electronic module 12, through the differential transformers 1 and 2, and eventually through the resistance 33 connected between the neutral conductive path and the ground terminal. During such current flow through the neutral conductive path, no current is flowing through the normally hot conductive path so a differential current and magnetic flux appears and induces a signal in differential transformer 1 actuating the ground fault interruption circuit causing the mechanism to trip. Th contacts cannot be reset as long as the hot line conductor 3 is connected to the neutral terminal lead 31 of device 11. Thus, the neutral line conductor 4 must be connected to the neutral terminal lead 31 before the device 11 will be operative which assures the neutral conductor will always be correctly connected to the conductive path which includes breaker contacts 20 and 22 having a shorter gap when being reset than breaker contacts 19 and 21.

I claim:

1. A sequential resetting circuit interrupter for an electrical device, including a first pair of contacts comprising first and second contacts to interrupt a neutral current path in which they are connected, a second pair of contacts comprising third and fourth contacts to interrupt an electrified current path in which they are connected, said first and third contacts comprising a third contact pair connected on the line side of said interrupter to respective neutral and electrified line conductors, said second and fourth contacts comprising a fourth contact pair connected on the load side of said interrupter to respective neutral and electrified conductors leading to a load, at least one of said third and fourth contact pairs being movable relative to the other between a contact open and a contact closed position, contact carrier means to carry said one pair of movable contacts between a contact open and a contact closed position, and sequential resetting means associated with said contacts and said carrier to close said first pair of contacts first when resetting and said second pair of contacts thereafter.

2. A sequential resetting circuit interrupter for an electrical device as set forth in claim 1, wherein said contact carrier means is rockable laterally.

3. A sequential resetting circuit interrupter for an electrical device as set forth in claim 2, wherein said contact carrier means comprises a member having first and second surfaces, each on opposite sides thereof, said first surface facing in a direction of contact closing, said second surface facing in a direction of contact opening, said third pair of contacts comprising said first contact and said third contact being mounted on said carrier member for movement between a contact open and contact closed position, said contacts being mounted to face in the same direction as said first surface of said carrier member, said first contact being mounted adjacent one lateral side of said member, said third contact being mounted adjacent the opposite lateral side of said member in spaced apart relation to said first contact, said fourth pair of contacts comprising said second contact and said fourth contact being fixedly mounted in said interrupter and aligned for contact respectively with said first and third contacts when said contact carrier member moves to a contact closed position.

4. A sequentially resetting circuit interrupter for an electrical device as set forth in claim 3, wherein said sequential resetting means includes a lateral groove in said carrier member opening to said second surface thereof, said groove continuously deepening in a direction from the side of said carrier on which said first contact is mounted towards the side on which said third contact is mounted.

5. A sequential resetting circuit interrupter for an electrical device as set forth in claim 4, including a main spring operably associated with said interrupter said main spring including an extending cross-bar to seat in said lateral groove and bias there against, the axis of said cross-bar being normally parallel with the plane in which said first and third contact faces lie, the floor of said continuously deepening lateral groove normally extending at an angle to said cross-bar and engaging said cross-bar at the lateral edge region toward the side of said carrier member on which said first contact is mounted, the opposite edge of said groove floor being normally spaced apart from the corresponding portion of said main spring cross-bar with which it is rockably engageable.

6. A sequential resetting circuit interrupter for an electrical device as set forth in claim 4, including a main spring operably associated with said interrupter, said main spring including an extending cross-bar to seat in said lateral groove and bias thereagainst, when said first and second pairs of contacts are in the contact closed position the floor of said continuously deepening lateral groove being arranged to extend at an angle to said cross-bar and to engage said cross-bar at the lateral edge region toward the side of said carrier on which said first contact is mounted, the opposite edge of said groove floor then being spaced apart from the corresponding portion of said main spring cross-bar with which it is rockably engageable.

7. A sequential resetting circuit interrupter for an electrical device as set forth in claim 2, wherein said sequential resetting means includes at least one of said first and second contacts, said one of said contacts being relatively longer in elevation than any of the other of said contacts whereby in contact open position the gap between said first and second contacts is relatively shorter than the gap between said third and fourth contacts and whereby when resetting said first and second contacts close first and said third and fourth contacts close in sequence thereafter.

8. A sequential resetting circuit interrupter for an electrical device as set forth in claim 2 wherein said sequential resetting means includes said first and second contacts, the combined length of said first and second contacts in elevation being greater than the combined length of said third and fourth contacts, whereby in contact open position the gap between said first and second contacts is relatively shorter than the gap between said third and fourth contacts, and whereby when resetting said first and second contacts make first and said third and fourth contacts make in sequence thereafter.

9. A sequential resetting circuit interrupter for an electrical device as set forth in claim 1, including a ground terminal electrically associated with said interrupter, crossed-connection defeater means to prevent connection of said first contact to an electrified line conductor and said third contact to a neutral line conductor, said defeater means including a resistance connected in series between said second contact and said ground terminal.

10. A sequential resetting circuit interrupter for an electrical device as set forth in claim 9, including ground fault sensing means, said circuit interrupter being responsively associated with said ground fault sensing means.

11. A sequential resetting circuit interrupter for an electrical device as set forth in claim 10 wherein said electrical device is an outlet receptacle, said ground fault sensing means and said circuit interrupter responsively associated therewith being mounted within said outlet receptacle.

* * * * *